United States Patent [19]
Yoshimura et al.

[11] 3,911,009
[45] Oct. 7, 1975

[54] PROCESS FOR THE PRODUCTION OF ACRYLAMIDE AND METHACRYLAMIDE

[75] Inventors: Kiyotaka Yoshimura, Fujisawa; Shiro Asano; Tadatoshi Honda, both of Yokohama, all of Japan

[73] Assignee: Mitsui Toatsu Chemicals, Incorporated, Tokyo, Japan

[22] Filed: Dec. 6, 1971

[21] Appl. No.: 205,137

[30] Foreign Application Priority Data
Dec. 14, 1970  Japan .............................. 45-110514

[52] U.S. Cl. .......................... 260/561 N; 260/561 N
[51] Int. Cl.² ....................................... C07C 103/08
[58] Field of Search ................................ 260/561 N

[56] References Cited
UNITED STATES PATENTS

| | | |
|---|---|---|
| 3,381,034 | 4/1968 | Greene et al. ............... 260/561 N X |
| 3,597,481 | 8/1971 | Tefertiller et al. ........... 260/561 N X |
| 3,631,104 | 12/1971 | Habermann et al. ........ 260/561 N X |
| 3,642,894 | 2/1972 | Habermann et al. ............ 260/561 N |
| 3,758,578 | 9/1973 | Habermann et al. ............ 260/561 N |
| 3,766,088 | 10/1973 | Yoshimura et al. ............. 260/561 N |

FOREIGN PATENTS OR APPLICATIONS

| | | | |
|---|---|---|---|
| 2,036,126 | 2/1971 | Germany ......................... | 260/561 N |
| 45-21295 | 7/1970 | Japan .............................. | 260/561 N |

*Primary Examiner*—Ethel G. Love
*Attorney, Agent, or Firm*—Fisher, Christen & Sabol

[57] ABSTRACT

An improved process for preparing acrylamide or methacrylamide which process comprises the steps of reacting acrylonitrile or methacrylonitrile with water and/or a water donor in the presence of a catalyst consisting of a copper catalyst and a copper salt promoter, said copper salt being copper sulfate, copper nitrate, copper halide, or the copper salt of fatty acid.

5 Claims, 1 Drawing Figure

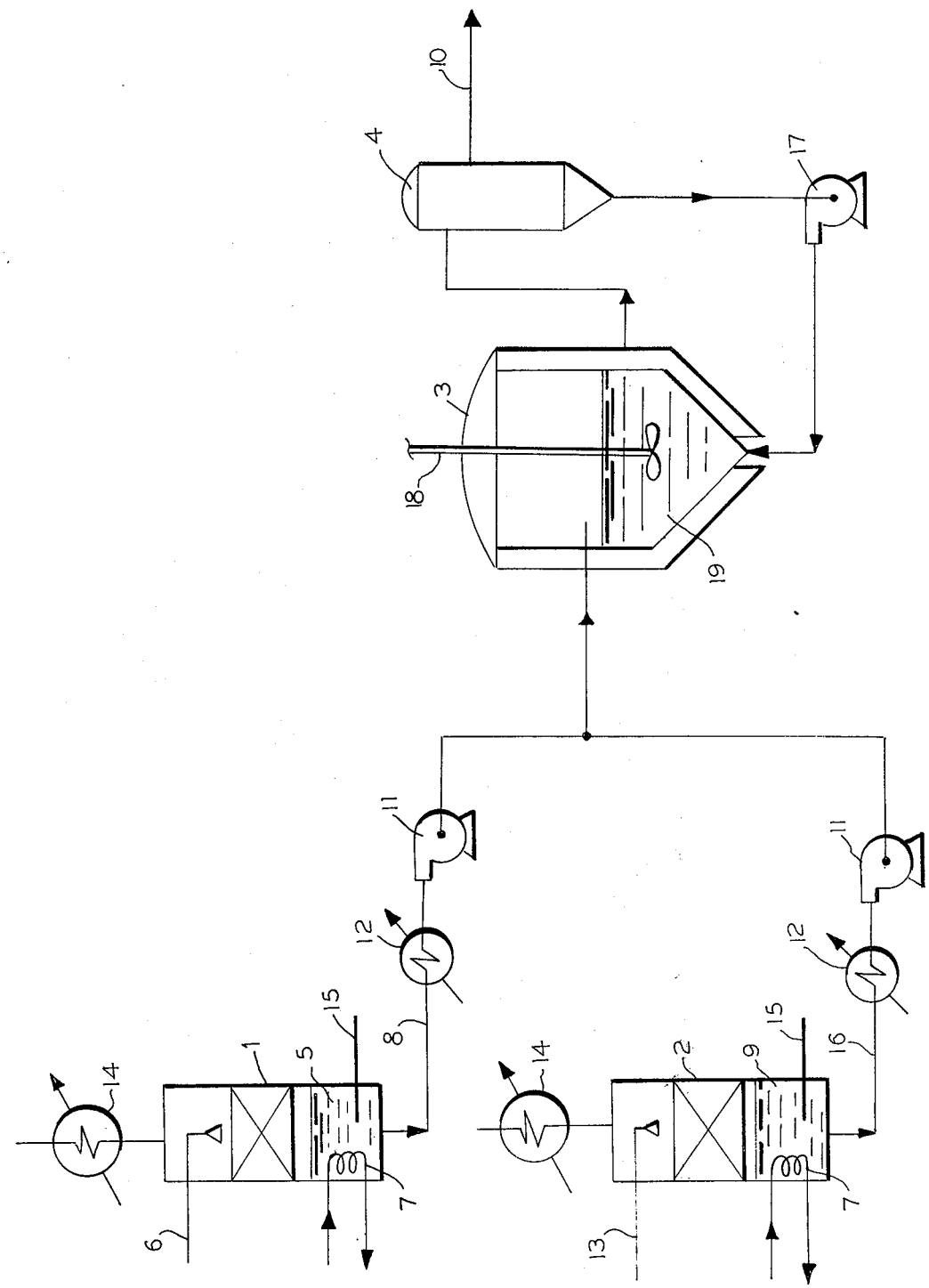

PROCESS FOR THE PRODUCTION OF ACRYLAMIDE AND METHACRYLAMIDE

BACKGROUND OF THE INVENTION

U.S. Pat. No. 3,381,034 teaches that cuprous ions catalyze the hydrolysis of nitriles and discloses that such ions may be provided by a cupric salt and copper metal. Metallic copper alone was disclosed and exemplified to have no catalytic effect in the process, although the patentees could not explain the advantages of the presence of copper metal when the cuprous ion was present. Reaction times in the order of 20 hours were usually necessary to obtain a conversion greater than 25 mol percent based on the nitrile.

It is known that acrylamide or methacrylamide may be prepared from acrylonitrile or methacrylonitrile in the presence of a copper metal catalyst. The copper catalysts suitable for the process include Raney copper, Ullmann copper, reduced copper, and copper catalysts containing metallic nickel, chromium, manganese, zinc or molybdenum as well as oxides and sulfides of these metals or such catalysts supported on carriers. (U.S. Patent Application Ser. No. 56,967, filed on July 21, 1970 owned by the assignee of the present application).

When acrylonitrile or methacrylonitrile is hydrated using one of the aforementioned catalysts, a reaction for producing acrylamide can be carried out in the presence of a very small amount of the copper catalyst, for example, about 0.01 g of the copper catalyst based on 1 mol of acrylonitrile. However, a high conversion is not obtained, and in order to adopt this as an industrial process, a more effective catalyst system is desired.

OBJECTS OF THE INVENTION

An object of the present invention is to provide a novel catalyst system for preparing acrylamide or methacrylamide by reacting acrylonitrile or methacrylonitrile with water and/or a water donor.

Another object of the present invention is to accelerate the reaction rate of the hydration of acrylonitrile or methacrylonitrile to improve catalytic efficiency of copper catalysts advancing the economy of the process.

SUMMARY OF THE INVENTION

In accordance with the present invention, acrylonitrile or methacrylonitrile reacts with water and/or a water donor in the presence of a catalyst system consisting of a copper catalyst of Raney copper, Ullmann copper, reduced copper and these catalysts carried by carriers and, as a promoter, at least one copper salt selected from the group consisting of copper sulfate, copper nitrate, copper halide and copper salts of fatty acids. The amount of said copper salt should be below 400 ppm (parts per million) based upon the available water present and preferably less than 150 ppm to efficiently produce acrylamide or methacrylamide at a high yield. As little as 5 ppm significantly increases the rate of conversion and mol percent conversion. The term "copper" when used in reference to a copper ion, is intended to include both cuprous and cupric ions and mixtures thereof. When the amount of copper salt exceeds as little as about 500 ppm, tests have revealed that the promoter actually hinders the catalytic efficiency of copper catalysts.

FIG. 1 is a flow sheet of one embodiment of the present invention.

DETAILED DESCRIPTION OF THE PRESENT INVENTION

Copper salts useful as promoters in the present invention include cuprous and/or cupric nitrate, halides such as chloride, bromide, and iodide, and salts of fatty acids such as acetic, propionic, butyric, valeric, capronic, oenanthic, caprylic, pelargonic, capric, undecanoic, lauric, tridecanoic, myristic, pentadecanoic, palmitic, margaric, stearic, nonadecanoic and arachidic acids. These copper salts may be added to the reaction liquid as a copper salt or may be formed in situ, for example, by reaction of the respective inorganic or organic acid on a part of the copper catalyst.

If the amount of these copper salts dissolved and existing in the reaction liquid is at least 5 ppm and preferably about 10 ppm, the increased yield and reaction rate of the present invention is obtained.

The effect of the copper salt is not dependent upon large concentrations of the copper salt in the reaction liquid. To the contrary, when a large amount of the copper salt is used, it provides a reverse effect by shortening the life of the copper catalyst used. For example, when about 2 percent copper nitrate is used, the activity of the copper catalyst will decrease rapidly due to a reaction between nitric acid ion and the copper salt.

Accordingly, it is preferred to adjust the amount of the copper salt existing to maintain a preferred range of 5–150 ppm of the reaction liquid calculated as copper. If the amount exceeds 150 ppm, the production efficiency of the process decreases.

The valence state of the copper salt may be either $Cu^+$ or $Cu^{++}$. The reason therefor is that coexistence of $Cu^{++}$ with the copper catalyst within the reaction system produces the following equilibrium:

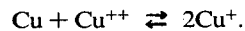

$$Cu + Cu^{++} \rightleftarrows 2Cu^+.$$

Under the ordinary reaction conditions, this equilibrium tends to be biased to $Cu^+$ side.

The copper catalyst used may be a Raney copper, Ullmann copper, reduced copper, these catalysts carried by carriers, a copper catalyst containing metallic nickel, chromium, manganese, zinc and/or molybdenum or an oxide or sulfide of copper, nickel, chromium, manganese, zinc or molybdenum.

The copper catalyst is normally used within a range of 0.01 – 100 g per mol of acrylonitrile or methacrylonitrile as taught in the aforementioned co-pending application.

Combinations in the catalyst system constituted by different copper salt promoters and copper catalysts are not limited to any particular combination and substantially the same effects are obtained with all combinations.

The reaction of acrylonitrile or methacrylonitrile with water in the present invention is the preferred embodiment. However, it is also possible to produce acrylamide or methacrylamide by using acrylonitrile or methacrylonitrile and a water donor, for example, an alcohol.

The water donor may be an aliphatic monohydric alcohol such as methanol, ethanol, n-propanol, isopropanol, secondary butanol, tertiary butanol, pentanol-2, pentanol-3, 2-methylbutanol-3, 4-methylpentanol-2, hexanol-2 and hexanol-3; an aliphatic dihydric alcohol such as hexylene glycol, butylene glycol, propylene glycol and ethylene glycol; or an alicyclic alcohol such as cyclohexanol.

The amount of water and water donor vis-a-vis acrylonitrile or methacrylonitrile used in the present invention is not particularly limited and may vary depending upon the desired concentration of acrylamide or methacrylamide.

The reaction in accordance with the present invention can be carried out at room temperature (25°C) or less. It is possible to increase the reaction rate by elevating the reaction temperature. The usual temperature range if 50°– 300°C and preferably 50° – 150°C.

It is also possible to add a solvent to the reaction system when carrying out the present invention. Examples of suitable solvents are methanol, ethanol, isopropanol, acetone, dimethyl formamide, dimethyl sulfoxide, formamide and acetamide. By adding the aforesaid solvents to the reaction system, it is possible, for example, to increase the concentration of acrylonitrile in water.

One advantage of adding acrylamide to the reaction system in advance is the use of acrylamide as a solvent which makes possible an increase in the concentration of acrylonitrile.

Upon carrying out the present invention, it is preferable that the pH of the reaction system be neutral, mildly acid or mildly alkaline. The reason is that when using acrylonitrile as a starting material, the production of ethylene, cyanhydrine, acrylic acid and/or acrylamide polymer is inhibited. However, when the reaction is carried out in accordance with the process of the present invention, in almost all cases, pH will be within the range of 5 – 9 without adding a pH control agent or a buffer solution, and it is possible to carry out the reaction without pH adjustment.

The acrylamide or methacrylamide solution obtained by the process of the present invention may be used immediately without purification because the amount of copper salt is very small. This is particularly advantageous because crystals of acrylamide or methacrylamide can be produced by merely evaporating the water. And furthermore, it is possible to immediately use these solutions to obtain polymers suitable for paper processing and other similar uses.

Of course, if necessary, it is possible to remove the copper ions by known procedures, for example, by using an ion exchange resin.

Another advantage of the present invention is to remarkably improve the reaction rate of producing acrylamide or methacrylamide from acrylonitrile or methacrylonitrile, thereby providing a process which can be carried out industrially and efficiently.

As compared with a process using a metallic copper catalyst alone, the process of the present invention increases the reaction rate, thereby obtaining higher conversion under the same reaction conditions, and as a result, it becomes possible to decrease the amount of an expensive copper catalyst and reduce the length of a continuous reactor.

One embodiment of an apparatus useful in preparing acrylamide or methacrylamide in accordance with the process of the present invention is explained by reference to FIG. 1.

In FIG. 1, 1 and 2 both designate Raschig ring packed towers each having a steam heater and an inlet on the tower bottom through which nitrogen gas is introduced. 3 is a reactor having a steam heating jacket so that it can be maintained at an elevated reaction temperature and 4 is a catalyst separating vessel to separate a catalyst from the reaction liquid. Water is supplied via pipe 6 to the top of the packed tower 1. Through an inlet for nitrogen 15, nitrogen is blown into the packed towers 1 and 2. Through the bottom of the packed tower 1, steam is passed to a heater 7, water 5 is boiled mildly and steam rises through the packed tower and is in turn condensed in a condenser 14 at the tower top and is refluxed inside the tower. Oxygen dissolved and existing in the water is almost completely removed through evaporation and action of countercurrent contact with nitrogen. Deoxygenated water is fed through a pipe 8 and a cooler 12 to the reactor 3 by a pump 11. Acrylonitrile 9 supplied to the packed tower 2 via the pipe 13 is removed after the dissolved oxygen by the same treatment as the water, and transferred via pipe 16 to the reactor 3. Inside the reactor, there is Raney copper catalyst which has been prepared and washed with water according to an ordinary manner. The catalyst is vigorously stirred by a stirrer 18 and mixed with the liquid reactants 19 to form a suspension phase. Liquid reaction product is separated from the catalyst in the catalyst separating vessel 4 and withdrawn from the system via pipe 10. The catalyst which has precipitated at the bottom of the catalyst separating vessel 4 is returned to the reactor 3 by a pump 17. It is preferable to replace the air inside the reactor 3 and the catalyst separating vessel 4 with nitrogen prior to the reaction and separation steps.

The following embodiments are illustrative of the present invention.

EXAMPLE 1

An experiment was conducted using the apparatus shown in FIG. 1.

Copper nitrate was added to the water, in an amount of 10 ppm calculated as Cu. From the pipe 6, water was supplied at a rate of 700 g/hr and from the pipe 16, acrylonitrile was supplied at a rate of 140 g/hr. The reaction temperature was 120°C and the average residence time inside the reactor was 60 minutes. The amount of Raney copper catalyst inside the reactor was 240 g and the reactor was maintained under a pressure of 4 kg/cm² gauge by nitrogen.

Gas chromatography analysis of the reaction liquid produced showed 40 g/hr of acrylonitrile and 134 g/hr of acrylamide with no other product than acrylamide, and no side reactions.

This value represents a conversion of 71.5% with respect to acrylonitrile. For about 3 days the reaction was maintained with these conditions. One analysis of copper in the reaction liquid showed the amount of $Cu^+$ was 13.5 ppm and the amount of $Cu^{++}$ was very small. The pH of the reaction liquid was 6.5.

The quantitative determination of copper ion was carried out by polarography. Namely, $Cu^+$ showed a one-stage reduction wave corresponding to the reaction of $Cu^+ \rightarrow Cu°$, and $Cu^{++}$ showed a two-stage reduction wave corresponding to $Cu^{++} \rightarrow Cu^+ \rightarrow Cu°$, therefore, $Cu^{++}$ was determined by a first stage wave and $Cu^+$ plus $Cu^{++}$ were determined by a second stage wave.

For purposes of comparison, the amount of copper nitrate in the water was increased so that the amount of Cu became 100 ppm and the reaction was continued. The result of analyzing the reaction liquid after 8 hours shows that conversion of acrylonitrile to acrylamide was 68.4%. Analysis of copper in the reaction liquid at that time showed that the amount of $Cu^+$ was 160 ppm and the amount of $Cu^{++}$ was very small.

When the aforesaid experiment was repeated without adding copper nitrate to the water, conversion of acrylonitrile to acrylamide remained at about 48 – 50% for about 3 days after the reaction was initiated.

EXAMPLE 2

Into a four-necked 100 ml flask were introduced 2 g of Raney copper which had been prepared and washed with water, 25.0 g of acrylonitrile and 25.0 g of water into which copper sulfate was dissolved so that the amount of Cu ion provided was 50 ppm, and the mixture was refluxed at a reaction temperature of about 70°C for 2 hours, while being stirred in a nitrogen atmosphere.

Results of analyzing the reaction liquid produced by gas chromatography showed that conversion of acrylonitrile to acrylamide was 34.3% and other by-products were not produced.

When Example 1 was repeated using copper sulfate instead of copper nitrate, conversion of acrylonitrile to acrylamide was maintained at 67 – 70% for the first 3 days and products other than acrylamide could not be identified by gas chromatography.

When the aforesaid experiment was repeated without adding copper sulfate for the purpose of comparison, it was found that conversion of acrylonitrile to acrylamide was only 24.2%.

EXAMPLE 3

Instead of copper sulfate in Example 2, cupric chloride was used in conducting a similar experiment and the mixture was refluxed for 2 hours.

Results of analyzing by gas chromatography the reaction liquid produced showed that conversion of acrylonitrile to acrylamide was 32.2% and other by-products were not recognized.

Conversion of acrylonitrile to acrylamide, 1 hour after the start of the reaction, was 18.1%.

When the aforesaid experiment was repeated without adding cupric chloride for the purpose of comparison, conversion of acrylonitrile to acrylamide 1 hour after the start of the reaction, was 13.0%.

EXAMPLE 4

In a four-necked 100 ml flask were introduced 2 g of Raney copper which had been prepared and washed with water, 26.5 g of acrylonitrile and 18.0 g of water in which copper acetate was dissolved so that the amount of Cu ion was 100 ppm and the mixture was refluxed for 2 hours at a reaction temperature of 70°C, while being stirred in a nitrogen atmosphere.

Results of analyzing by gas chromatography the reaction liquid produced showed that conversion of acrylonitrile to acrylamide was 18.3% and other by-products were not shown to be present.

When the aforesaid experiment was repeated without adding copper acetate for the purpose of comparison, it was found that conversion of acrylonitrile to acrylamide was 13.2%.

EXAMPLE 5

Ten grams of cupric oxide produced from copper nitrate and caustic soda was reduced with 100 cc/min of hydrogen at 200°–250°C for 4 hours. 6.6 g of acrylonitrile and 36.2 g of water were added to the resultant catalysts and the water included copper acetate corresponding to a copper ion content of 50 ppm. The mixture was reacted at 70°C in a nitrogen atmosphere for 2 hours.

Results of analyzing the reaction liquid produced by gas chromatography showed that conversion of acrylonitrile to acrylamide was 57.2% and other by-products were barely perceptible.

When the aforesaid experiment was repeated without adding copper acetate for the purpose of comparison, it was found that conversion of acrylonitrile to acrylamide was 45.3%.

EXAMPLE 6

In the presence of a catalyst of 10 g of Ullmann copper prepared by the established process, 6.6 g of acrylonitrile and 36.0 g of water containing copper nitrate so that the amount of copper ion was 50 ppm, were added, and the mixture was reacted at 70°C in a nitrogen atmosphere for 2 hours.

Results of analyzing the reaction liquid produced byy gas chromatography showed that conversion of acrylonitrile to acrylamide was 38.9% and other by-products were not shown.

When the aforesaid reaction was repeated without adding copper nitrate for purposes of comparison, it was found that conversion of acrylonitrile to acrylamide was 25.5%.

EXAMPLE 7

2 g of Raney copper which had been prepared and washed with water and 4.2 g of methacrylonitrile and 36.0 g of water were charged in a four-necked 100 ml flask, and the mixture was reacted at a temperature of about 80°C under atmospheric pressure with stirring.

The results obtained by adding the following copper salts to said water so that the amounts of copper might become 50 ppm are shown in the following table.

| | Examples of the present invention | | | | Comparative Example |
|---|---|---|---|---|---|
| | Copper sulfate | Copper nitrate | Copper acetate | Cupric chloride | Non-addition |
| Amount of methacrylamide produced (g) | 4.6 | 4.8 | 4.5 | 4.6 | 4.1 |

EXAMPLE 8

Using an apparatus the same as in Example 1 and charging 22 g of Raney copper as a catalyst, a reaction was carried out under the same conditions as those of Example 1. 14 hours after the start of the reaction, the concentration of copper nitrate calculated as $Cu^{++}$ was increased from 10 ppm to 500 ppm and the reaction was carried out for an additional 16 hours.

During the two periods, conversions of acrylonitrile to acrylamide changed as shown in the following table, showing that an excess amount of copper nitrate shortens the life of the catalyst.

| Operating time (hr) | Amount of Cu++ in the water as (ppm) | Conversion of acrylonitrile in (%) |
|---|---|---|
| 4 | 10 | 35.0 |
| 8 | '' | 33.6 |
| 12 | '' | 29.0 |
| 14 | '' | 28.3 |
| 18 | 500 | 19.7 |
| 22 | '' | 10.2 |
| 26 | '' | 2.5 |
| 30 | '' | 1.4 |

What is claimed is:

1. In a process for preparing acrylamide or methacrylamide by reacting acrylonitrile or methacrylonitrile with water or a water donor in the presence of a metallic copper containing catalyst the improvement comprising adding to the reaction liquid a promoter for said catalyst, said promoter being selected from the group consisting of copper sulfate, copper nitrate, cupric chloride and a copper salt of a lower fatty acid, in an amount of from 10 to 150 ppm calculated as copper and based upon available water.

2. The improvement of claim 1 wherein said metallic copper containing catalyst is selected from the group consisting of Raney copper, Ullmann copper, reduced copper oxide, and copper containing (a) at least one metal selected from the group consisting of chromium and zinc or (b) a reduced oxide of said metal.

3. The improvement of claim 1 wherein said copper salt is selected from the group consisting of copper acetate, copper propionate, copper butyrate, copper valerate, copper caproate, and copper oenanthate.

4. The improvement of claim 2 wherein said copper salt is selected from the group consisting of copper acetate, copper propionate, copper butyrate, copper valerate, copper caproate and copper oenanthate.

5. A continuous process for preparing acrylamide or methacrylamide which comprises reacting acrylonitrile or methacrylonitrile with water or a water donor at a temperature of about 50° – 300°C. in the presence of 0.01 to 100 g per mol of acrylonitrile or methacrylonitrile of a copper catalyst selected from the group consisting of Raney copper, Ullmann copper, reduced copper oxide, and copper containing (a) at least one metal selected from the group consisting of chromium and zinc or (b) a reduced oxide of said metal, and adding to the reaction liquid a promoter selected from the group consisting of copper sulfate, copper nitrate and cupric chloride in an amount of about 10 to 150 ppm calculated as copper and based upon available water.

* * * * *